United States Patent [19]

Stahl

[11] Patent Number: 5,667,614
[45] Date of Patent: Sep. 16, 1997

[54] WEB FOR GRAPHICS TRANSFER TO GARMENT

[75] Inventor: Ted A. Stahl, Harrison Township, Mich.

[73] Assignee: Stahls' Inc., St. Clair Shores, Mich.

[21] Appl. No.: 649,030

[22] Filed: May 16, 1996

Related U.S. Application Data

[62] Division of Ser. No. 489,847, Jun. 13, 1995, Pat. No. 5,573,834.

[51] Int. Cl.$^6$ .................................................. B44C 1/165
[52] U.S. Cl. .................. 156/230; 156/234; 156/235; 156/344; 428/195; 428/346; 428/354; 428/411.1; 428/913; 428/914
[58] Field of Search ........................ 156/234, 230, 156/235, 239, 344; 428/195, 913, 914, 346, 354, 411.1; 427/148, 152; 524/242

[56] References Cited

U.S. PATENT DOCUMENTS

| | | | |
|---|---|---|---|
| 3,660,212 | 5/1972 | Liebe, Jr. | 161/41 |
| 4,423,106 | 12/1983 | Mahn | 428/207 |
| 5,112,423 | 5/1992 | Leibe, Jr. | 156/234 |
| 5,312,645 | 5/1994 | Dressler | 427/148 |
| 5,312,673 | 5/1994 | Dressler | 428/195 |
| 5,383,996 | 1/1995 | Dressler | 156/234 |

*Primary Examiner*—William Krynski
*Attorney, Agent, or Firm*—Brooks & Kushman P.C.

[57] ABSTRACT

A web suitable for the elevated temperature transfer of graphics to fabric comprises a thermoplastic film release sheet having upper and lower surfaces, the lower surface defining the bottom surface of the web. A layer of non-carboxylated, pigmented PVC is coated on and substantially covers the upper surface of the release sheet. The pigmented PVC includes a heat activated blowing agent. A thermoplastic adhesive layer defines the top surface of the web. The web may be used to provide both conventional as well as hot split graphics to fabric.

15 Claims, 1 Drawing Sheet

WEB FOR GRAPHICS TRANSFER TO GARMENT

This is a divisional of application(s) Ser. No. 08/489,847 filed on Jun. 13, 1995, now U.S. Pat. No. 5,573,834.

TECHNICAL FIELD

The subject invention pertains to a web suitable for the transfer of graphics and the like, particularly lettering, to a fabric, particularly a garment, by the application of heat and pressure.

BACKGROUND ART

For some time, it has been known to transfer a pigmented vinyl (PVC) graphic originating in a multilayer web, to a garment. One such technique is disclosed in U.S. Pat. No. 3,660,212 (Liebe). Liebe discloses a web having a paper release sheet, a pigmented PVC film or coated layer carried on the release sheet, and a thermoplastic vinyl adhesive layer carried on the PVC layer. The desired graphic, such as a letter of the alphabet, is die-cut in reverse image through all the layers and the release sheet. Individual cut letters are carefully placed on the fabric, adhesive side down, to form a word or the like. Heat and pressure are applied through the exposed, paper side of the cut letters, until the adhesive bonds to the fabric. After the letters cool, the paper is pulled away, leaving the pigmented PVC layer of each letter adhered to the garment as the visible graphic.

U.S. Pat. No. 4,423,106 (Mahn) discloses a web usable in a similar manner for applying graphics to a fabric. The release sheet carries a pigmented polyurethane layer which provides the visible graphic, and the adhesive carried by the polyurethane layer, is polyester.

In Liebe, U.S. Pat. No. 5,112,423, is disclosed an embodiment for transferring a graphic to fabric, wherein the release sheet is a clear polyester, the PVC graphic layer is a partially carboxylated PVC, and the adhesive layer is an encapsulating thermoplastic. This web is intended for computer cutting of the graphic pattern in reverse image, through the adhesive and pigmented layers, but not through the release sheet. After cutting, the unwanted portions of the pigmented and adhesive layers are peeled, or "weeded" away, leaving a multi-unit graphic pattern, such as a word, in reverse image on the release sheet. The release sheet is positioned so that the adhesive side of the graphics pattern is in contact with the fabric. Partial carboxylation of the PVC pigmented layer is deemed necessary to provide sufficient adhesion between the PVC layer and the polyester release sheet, to prevent shifting or premature lifting while the letters are being cut and weeded, and while the cut web is being positioned relative to the garment.

In the techniques described immediately above, the full thickness of the PVC letter is transferred to the garment via the adhesive layer as the letter detaches from the release sheet. Another technique is known whereby a specially treated PVC ink layer is carried by a paper release sheet, without an adhesive layer. The inked side is placed on the fabric. Upon heating, the ink portion constituting, e.g., a letter, adheres to the fabric directly, but "splits" as the release sheet is pulled away, thereby leaving some of the letter material adhered on the release sheet. In essence, when the letter is heated, foaming agents or the like in the ink weaken the cohesiveness of the ink material, so that approximately one half the original thickness adheres to the release sheet, while the other half of the thickness bonds to the garment. This is sometimes referred to as the "hot split" technique.

Hot split transfer is usually performed by a screen print process. Sometimes, a powdered adhesive is sprinkled on the ink layer before placing the ink layer against the fabric, to enhance bonding.

It would be desirable to provide a web material suitable for conventional or hot split thermal transfer to garments and the like with a single material. It would further be desirable to provide a web employing a transparent release sheet from which graphics patterns may be "kiss cut" and unwanted portions weeded away without resort to a carboxylated PVC.

SUMMARY OF THE INVENTION

It is an object of the present invention to provide a web having a transparent release backing to facilitate the transfer of graphics to a garment or the like but which can be used in either the full transfer or the hot split technique.

The inventive web has a release sheet of substantially transparent polyester, a pigment layer of non-carboxylated PVC containing foaming or other heat activated weakening agent(s) coated onto the release sheet, and a thermoplastic adhesive, such as polyester or polyurethane as the top layer of the web.

These and other objects and advantages of the invention will be further understood from the description of the preferred embodiment set forth below with reference to the accompanying drawings.

DESCRIPTION OF THE PREFERRED EMBODIMENT

Figure 1:
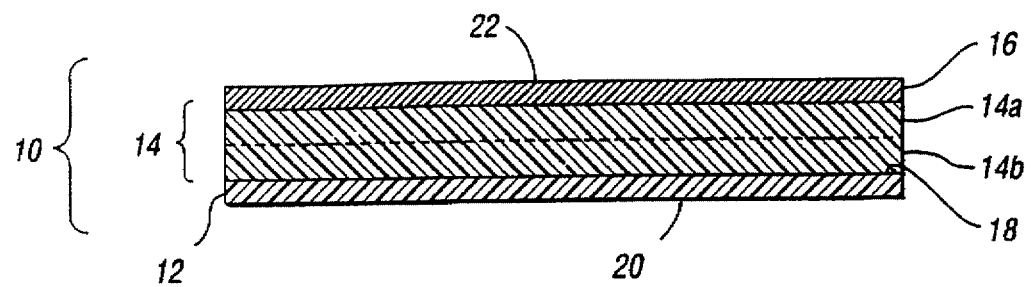
FIG. 1 illustrates a side view of the web of the subject invention showing one embodiment of its layered structure.

The multi-layer web of the present invention comprises minimally a relatively substantial transparent or translucent polymer film release sheet; superficial to the release sheet, a layer of pigmented PVC containing a heat-activatable weakening agent, and superficial to the pigmented PVC layer, an adhesive layer to facilitate bonding to the fabric to which the transfer is to be applied by full transfer or hot split techniques. The relatively substantial nature of the release sheet pertains to its strength and thickness, which desirably allow computer guided "kiss cutting" without cutting through the thickness of the release sheet as might occur from errors in the precision of the depth of the knife used to cut the pattern, and which provides sufficient strength to allow weeding of the unwanted portions of the design without damaging the integrity of the release sheet. The pigmented PVC layer is a non-carboxylated polyvinylchloride which may be applied as a film, emulsion, or solution, preferably as an ink dispersion or emulsion.

Optionally, one or more additional layers of pigmented thermoplastic material can be sandwiched between the PVC layer carried by the release sheet, and the adhesive layer. Also optionally, the PVC layer carried by the release sheet, can include other additives such as metallic flakes, glass beads or the like, to affect surface properties such as texture, upon removal of the release sheet.

Surprisingly, the non-carboxylated PVC coating including weakening agent, has been found to adhere sufficiently to the polyester release sheet, that no shifting or undesirable premature lifting of the letters during cutting and positioning, occurs.

The PVC pigment layer is preferably applied as an ink to the release sheet. The ink contains a foaming agent which activates at a temperature in the range of about 300°–350° F. The decomposition or volatilization of the foaming agent generates gas bubbles which expand and weaken the PVC pigment layer. When the web is heated to this extent, the adhesive layer bonds to the garment. If the release sheet is pulled away while the pigment layer is hot, the pigment layer splits, leaving some pigment adhered to the release sheet, and the balance adhered to the adhesive layer and thence the garment or other material. If the release sheet is pulled away after the web has cooled, none of the pigment layer remains with the release sheet.

When the release sheet is peeled away hot, the split pigment layer produces a velvety appearance. This can be varied by the inclusion of the optional surface affecting materials. When the release sheet is peeled away cold, the graphic on the garment has the appearance of a solid layer of PVC, as with a conventional full transfer. The surface of this graphic can also be enhanced by including the optional materials.

The drawing shows a section view of the web 10 having as its lower surface a polymer film release layer 12 consisting of an uncoated, light transmitting polymer film-having a thickness preferably in the range of 4–7 mils. This serves as a substantially transparent release sheet. The polymer film release layer may be fully transparent or partially transparent (translucent). Fully transparent release layers are preferred. A pigment layer 14 is in direct contact with the release sheet, and an adhesive layer 16 defines the top surface of the web. The polymer film must maintain its integrity at the elevated temperature at which the transfer is to be made, i.e., it must not melt or shrink to any great degree or fuse or intermingle with the PVC pigment layer. It must also retain sufficient strength so as to be peelable away from the PVC pigment layer while still hot. The polymer film is preferably polyester, but may also be transparent nylon, etc.

The pigment layer 14 is coated, preferably as an ink having a thickness of 6–12 mils, onto the release sheet 12. The ink is preferably a dispersion, emulsion, or solution of PVC resin such as is available from the Geon Company of Cleveland, Ohio, as Geon Vinyl 138 or Geon Vinyl 180X5, dissolved in a monomeric plasticizer such as Santicizer 278, available from the Monsanto Company of St. Louis, Mo. An appropriate pigment dispersion is added for color, in a manner well known in the art. A blowing or foaming agent (i.e., weakening agent) is also included in the ink, for example an azo compound such as 1,1'-azobisformamide (azocarbonamide), or mechanically active hollow microspheres, e.g., as available under the trademark Expandcell from Nobel Industries (Sweden).

Optionally, other weakening agents such as calcium carbonate, talc, clay, and silica can be included in the ink. These materials also affect the texture at the exposed surface of the pigment layer after use in the hot split mode. Optionally, a second pigmented layer (indicated at 14a), preferably in the color white, can be coated onto the main pigmented layer (indicated at 14b), for the purpose of improving opacity, but this second pigmented layer is devoid of the blowing or foaming agent included in the formulation.

The adhesive, or top layer 16, is preferably a water based thermoplastic urethane such as Neotac R9320, available from Zeneca Resins Company of Wilmington, Mass. This can be applied in a 2 mil thickness onto the uppermost pigment layer, which is layer 14 in the illustrated embodiment. Other thermoplastic adhesives are suitable as well.

The resulting web 10 thus comprises a polyester film release sheet 12 having upper and lower surfaces 18,20 the lower surface 20 defining the bottom surface of the web. A layer 14 of non-carboxylated, pigmented PVC is coated on and substantially covers the upper surface 18 of the release sheet. The pigmented PVC includes a heat activated blowing agent. A thermoplastic adhesive layer defines the top surface 22 of the web 10.

Figure 2:
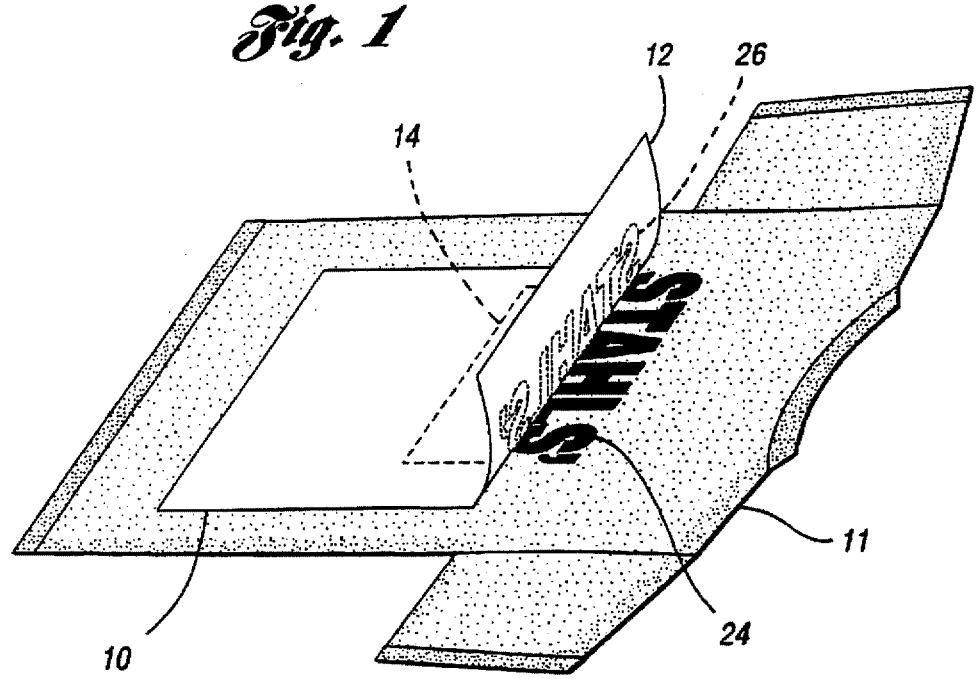
FIG. 2 illustrates a graphic fully applied to a textile surface.

FIG. 2 illustrates a total transfer. A graphic consists of a portion of PVC layer 14 not weeded away from release sheet 12 of web 10. The web is placed over the textile material to which it is to be transferred, in this case a T-shirt, and heated in a press, then allowed to cool. When cool, the release sheet is peeled away, leaving the entire graphic PVC layer 24 bonded to the shirt 11. At 26 is the area on the release sheet where the graphic was previously located, while at 14, the release sheet has not been pulled fully away, and thus the graphic, while bonded to the shirt, also weakly adheres to the release sheet.

Figure 3:
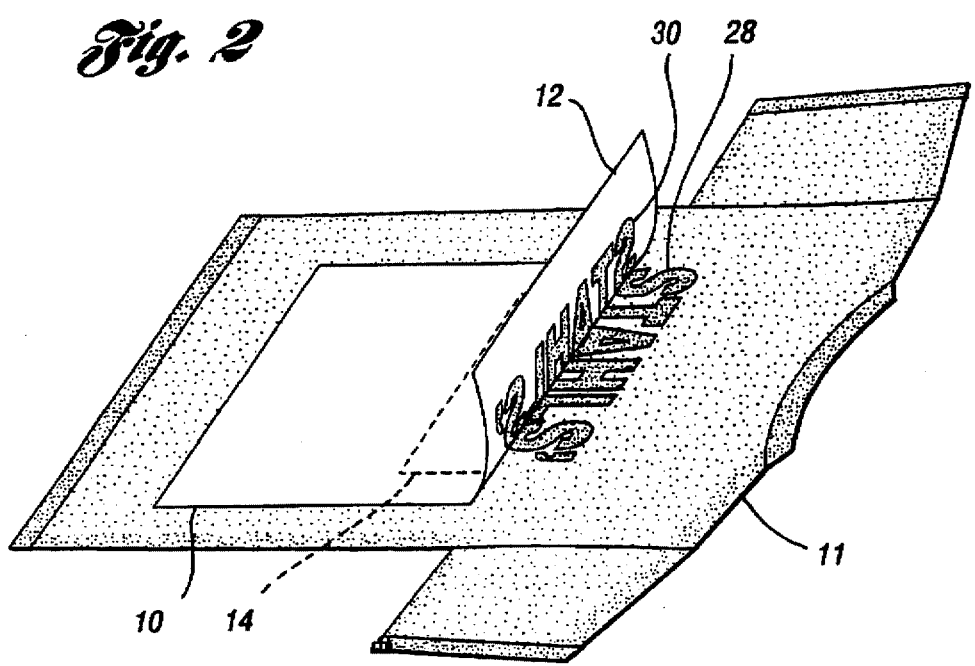
FIG. 3 illustrates a hot split graphic applied to a textile surface.

FIG. 3 illustrates a hot-split transfer. The transfer is applied as in FIG. 2, but the release sheet 12 is peeled away while still hot. A portion of graphic 14 adheres to the T-shirt at 28, while a portion 30 also remains adhered to the release sheet.

Having now fully described the invention, it will be apparent to one of ordinary skill in the art that many changes and modifications can be made thereto without departing from the spirit or scope of the invention as set forth herein.

What is claimed is:

1. A method for transferring a graphic design to a fabric substrate, said graphic design having a selectable smooth or velvety appearance, said method comprising:

a) contacting a heat-activatable adhesive layer of an appearance selectable web with a fabric substrate, said appearance selectable web comprising in order, a release layer, a transfer layer, and an adhesive layer, wherein said release layer maintains its integrity at an elevated temperature sufficient to bond said transfer layer to said fabric substrate;

wherein said transfer layer comprises pigmented PVC disposed superficial to said release layer, said transfer layer further comprising one or more heat-activated weakening agents, said heat-activated weakening agents effective to split said transfer layer into a release layer-adherent transfer layer portion and a fabric substrate-adherent transfer layer portion when said release layer is pulled away from said transfer layer while hot but which does not split into said release layer-adherent layer portion and said fabric substrate-adherent layer portion when said release layer is pulled away from said transfer layer after cooling; and wherein said adhesive layer comprises one or more heat activatable adhesives;

b) heating said web and said fabric substrate to an elevated temperature and at a pressure sufficient to cause said transfer layer of said web to bond to said fabric substrate;

c) removing said release layer of said web from said transfer layer at a temperature selected from i) a first, hot temperature such that said weakening agent causes said transfer layer to split into a release layer-adherent layer portion and a fabric substrate-adherent layer portion thereby forming a graphic having a velvety appearance on said fabric substrate; and ii) a second temperature, cooler than said first temperature, such that said transfer layer does not split, thereby forming a graphic of glossy appearance on said fabric substrate; and d) recovering a fabric substrate having a graphic design transferred thereto.

2. The process of claim 1, wherein prior to said step of contacting (a), said web is kiss cut to form a graphics design of desired shape such that the depth of said kiss cut extends through said heat-activatable adhesive layer and said transfer layer, but not completely through said release layer, and following said kiss cut, portions of said heat-activatable layer and said transfer layer not corresponding to said graphics design of desired shape are removed from said release sheet.

3. The method of claim 1, wherein said appearance selectable web further comprises one or more intermediate pigmented layer(s) disposed mediate said transfer layer and said heat-activatable adhesive layer, said pigmented intermediate layer(s) devoid of weakening agents which allow splitting of said intermediate layer(s) at elevated temperatures.

4. The method of claim 1 wherein said transfer layer comprises a pigmented non-carboxylated PVC ink composition containing a foaming agent which activates at a temperature in the range of about 300°–350° F. and a heat-activatable weakening agent.

5. The method of claim 1 wherein said weakening agent comprises a heat activated blowing agent or foaming agent.

6. The method of claim 5 wherein said weakening agent is 1,1'-azobisformamide.

7. The method of claim 1 wherein said transfer layer has a thickness in the range of from about 6 to about 12 mils.

8. The method of claim 1 wherein said second transfer layer contains calcium carbonate, talc, clay, silica, or mixtures thereof.

9. The method of claim 5 wherein said second transfer layer contains calcium carbonate, talc, clay, silica, or mixtures thereof.

10. The method of claim 1 wherein said adhesive layer comprises a water-based polyurethane.

11. The method of claim 1 wherein said transfer layer further comprises metallic flakes or glass beads.

12. The method of claim 1 wherein said release layer comprises a thermoplastic polyester film.

13. The method of claim 12 wherein said thermoplastic polyester film has a thickness of from about 4 to about 7 mils.

14. The method of claim 1 wherein said weakening agent comprises mechanically active hollow microspheres.

15. The method of claim 1 wherein said release layer comprises a translucent or transparent polymer film.

* * * * *